United States Patent [19]

Hirata

[11] Patent Number: 5,301,368
[45] Date of Patent: Apr. 5, 1994

[54] SYSTEM FOR CONTROLLING OPERATIONS OF GPS RECEIVER UNIT AND RADIO TELEPHONE UNIT FOR AUTOMOTIVE VEHICLE

[75] Inventor: Toru Hirata, Kanagawa, Japan

[73] Assignee: Nissan Motor Company, Ltd., Yokohama, Japan

[21] Appl. No.: 603,340

[22] Filed: Oct. 26, 1990

[30] Foreign Application Priority Data

Oct. 27, 1989 [JP] Japan ................................. 1-278552

[51] Int. Cl.⁵ ............................................. H04B 17/02
[52] U.S. Cl. ..................................... 455/78; 455/133; 455/140; 379/58; 342/419
[58] Field of Search ............... 455/74, 78, 88, 133, 455/136, 140, 277.1; 379/58; 342/385, 352, 419

[56] References Cited

U.S. PATENT DOCUMENTS

| | | | |
|---|---|---|---|
| 3,277,374 | 10/1966 | Kobayashi | 455/136 |
| 3,555,424 | 6/1967 | Malm | 455/34.2 |
| 3,696,422 | 10/1972 | Burrell | 342/385 |
| 4,060,766 | 11/1977 | Kazuo | 455/88 |
| 4,112,372 | 9/1978 | Holmes et al. | 375/1 |
| 4,161,734 | 7/1979 | Anderson | 342/352 |
| 4,287,599 | 9/1981 | Goncharoff et al. | 455/77 |
| 4,833,477 | 5/1989 | Tendler | 342/389 |
| 5,043,736 | 8/1991 | Darnell et al. | 342/357 |
| 5,056,153 | 10/1991 | Taniguchi | 455/133 |

FOREIGN PATENT DOCUMENTS 3522880 1/1986 Fed. Rep. of Germany .
492371 7/1970 Switzerland .

OTHER PUBLICATIONS

Toshiyuki Itoh, et al., "Navigation Systems Using GPS for Vehicles", Society of Automotive Engineers, Inc., Passenger Car Meeting & Exposition, Sep. 22-25, 1986, pp. 1-13.
Civil GPS from a Future Perspective, T. A. Stansell, Jr., IEEE, vol. 71, No. 10, Oct. 1983.

*Primary Examiner*—Reinhard J. Eisenzopf
*Assistant Examiner*—Andrew Faile
*Attorney, Agent, or Firm*—Lowe, Price, LeBlanc & Becker

[57] ABSTRACT

An operation control system includes a GPS receiver unit and a radio telephone unit. The GPS receiver unit includes a GPS antenna and a GPS signal receiver circuit connected thereto. The radio telephone unit includes a telephone antenna and a transmitter circuit connected thereto. The transmitter circuit transmits a call channel signal through the telephone antenna during the radio telephone unit being in an ON-CALL MODE and a control channel signal during an OFF-CALL MODE. The system is designed to set the transmitter circuit operative and the GPS signal receiver circuit inoperative during the ON-CALL MODE. On the other hand, the system allows alternate operations of the transmitter circuit and the GPS signal receiver circuit during the OFF-CALL MODE.

15 Claims, 3 Drawing Sheets

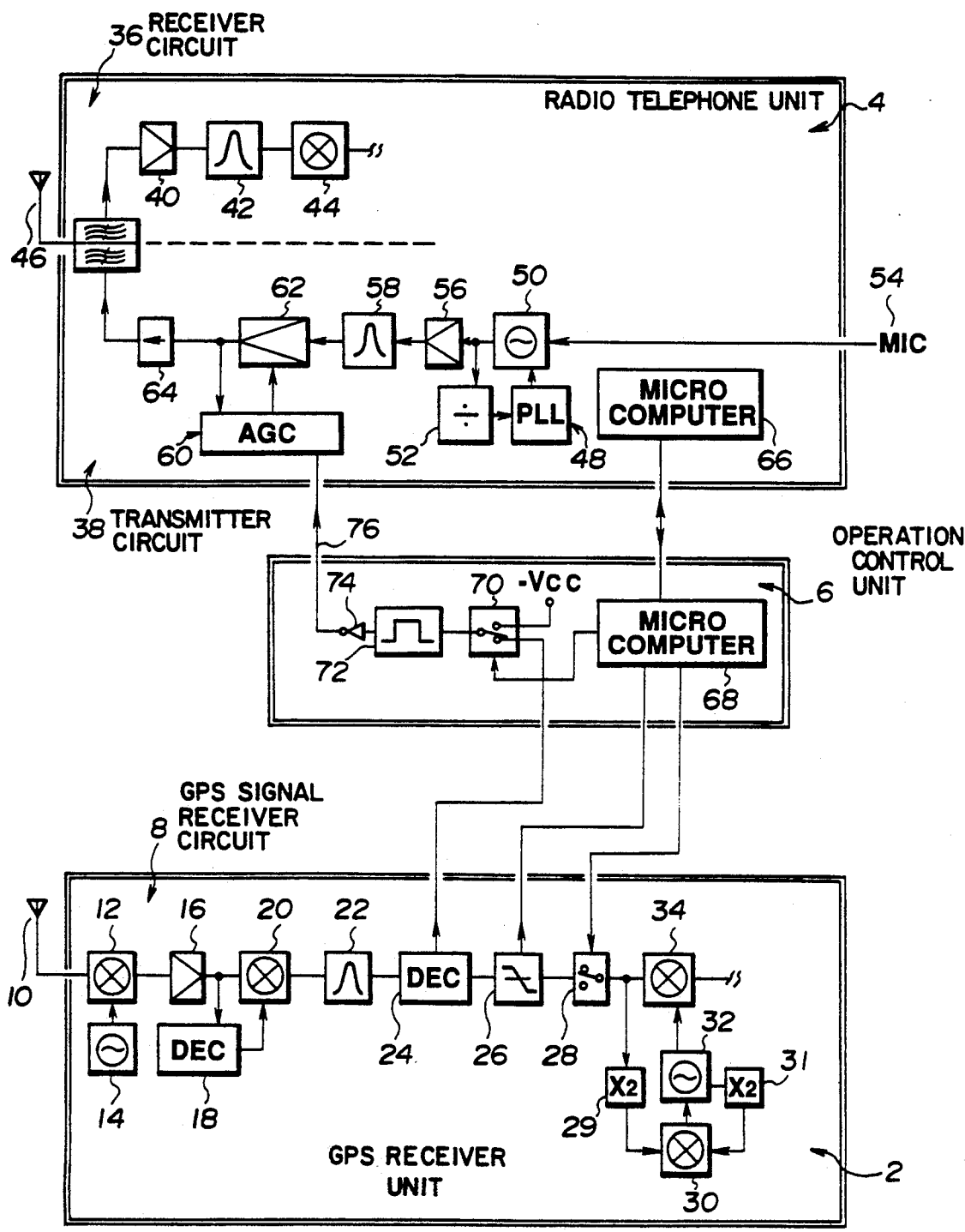

SYSTEM FOR CONTROLLING OPERATIONS OF GPS RECEIVER UNIT AND RADIO TELEPHONE UNIT FOR AUTOMOTIVE VEHICLE

BACKGROUND OF THE INVENTION

Field of the Invention

The present invention relates generally to a system for automatically controlling operations of a receiver unit for a global positioning system (GPS) and a radio telephone unit, for use in an automotive vehicle. More specifically, the present invention relates to the above-noted system which controls the GPS receiver unit and the radio telephone unit to be alternatively operated, particularly when a GPS signal receiving level is less than a preselected level.

Description of the Background Art

GPS is known which is utilized in a vehicular navigation system as disclosed, for example, in Japanese First Patent Publication (Tokkaisho) No. 60-15573, wherein a position and a traveling direction of an automotive vehicle installing a GPS receiver unit is precisely measured using radio signals from satellites.

An automotive radio telephone unit is also known, which includes a radio frequency transmitter circuit and a radio frequency receiver circuit for enabling voice communication by radio.

The GPS receiver unit requires its own GPS antenna for receiving the radio signals from the satellites, and the telephone unit requires its own telephone antenna for transmitting and receiving the telephonic radio signals. Accordingly, in cases the GPS receiver unit and the telephone unit are both installed in the vehicle, the GPS antenna and the telephone antenna are respectively mounted on the vehicular body.

The installation of the GPS receiver unit and the telephone unit in one vehicle raises the following problems:

In cases the vehicle travels in area where a receiving level of the GPS signal at the GPS antenna is lowered, for example, to less than −130 dBm, and further, a control channel signal for a control radio channel or a call channel signal for a call radio channel is transmitted through the telephone antenna, these signals jam the receiving GPS signal so that correct measurement of the vehicular position and the vehicular traveling direction can not be performed.

For example, when the control channel signal or the call channel signal is output through the telephone antenna, a receiving level $P_B$ of the control or call channel signal at the GPS antenna is derived based on the following equation (1):

$$P_B = +37\ dBm - 53\ dBm = -16\ dBm \quad (1)$$

where, $+37$ dBm is derived based on a telephone transmission or sending power of 5W, and $-53$ dBm is derived based on a measured propagation loss.

On the other hand, an allowable level $P_J$ of the jammer signal received at the GPS antenna is derived, for example, by the following equation (2):

$$P_J = -130\ dBm + 25\ dBm + 80\ dBm = -25\ dBm \quad (2)$$

where, $-130$ dBm is the above-noted GPS signal receiving level, $+25$ dBm is derived by a jammer signal resistant ratio and $+80$ dBm is derived by a filtering characteristic of the GPS receiver circuit.

Generally, in a range where $P_J$ is larger than $P_B$, the jammer signal, i.e. the telephone control or call channel signal does not substantially affect the GPS signal. On the other hand, in a range where $P_J$ is less than $P_B$, the GPS signal is substantially affected by the jammer signal, which results in incorrect measurement of the vehicular position and the vehicular traveling direction. As seen from the above-noted equation (2), the adverse affection of the jammer signal against the GPS signal becomes less as the GPS signal receiving level becomes high.

As appreciated from the above description, in cases the vehicle travels in the area where the GPS signal receiving level is, for example, less than −130 dBm with the GPS receiver unit and the telephone unit being installed therein, there is no way in the background art to avoid the adverse affection of the jammer signal against the GPS signal, which results in the incorrect measurement of the vehicular position and the vehicular traveling direction.

SUMMARY OF THE INVENTION

Accordingly, it is an object of the present invention to provide a system for controlling operations of a GPS receiver unit and a radio telephone unit that can eliminate the above-noted defects inherent in the background art.

It is another object of the present invention to provide a system for controlling operations of a GPS receiver unit and a radio telephone unit, that can control the GPS receiver unit and the telephone unit to be operated alternatively, particularly when a GPS signal receiving level is less than a preselected level.

To accomplish the above-mentioned and other objects, according to one aspect of the present invention, a system for controlling operations of a GPS receiver unit and a radio telephone unit, the GPS receiver unit including a GPS antenna for receiving a GPS signal and a GPS signal receiver circuit connected to the GPS antenna for processing the received GPS signal, the radio telephone unit including a telephone antenna and a telephone transmitter circuit connected to the telephone antenna for transmitting a cell channel signal during the radio telephone unit being in an ON-CALL MODE and a control channel signal during the radio telephone unit being in an OFF-CALL MODE, comprises:

first means for determining whether the radio telephone unit is in the ON-CALL MODE or the OFF-CALL MODE;

second means for setting the telephone transmitter circuit operative to transmit the call channel signal through the telephone antenna and for setting the GPS signal receiver circuit inoperative during the radio telephone unit being in the ON-CALL MODE;

third means for selectively setting the telephone transmitter circuit operative to transmit the control channel signal through the telephone antenna during the radio telephone unit being in the OFF-CALL MODE.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 2 is a circuitry block diagram showing the first preferred embodiment of the present invention;

DESCRIPTION OF THE PREFERRED EMBODIMENT

Figure 1:
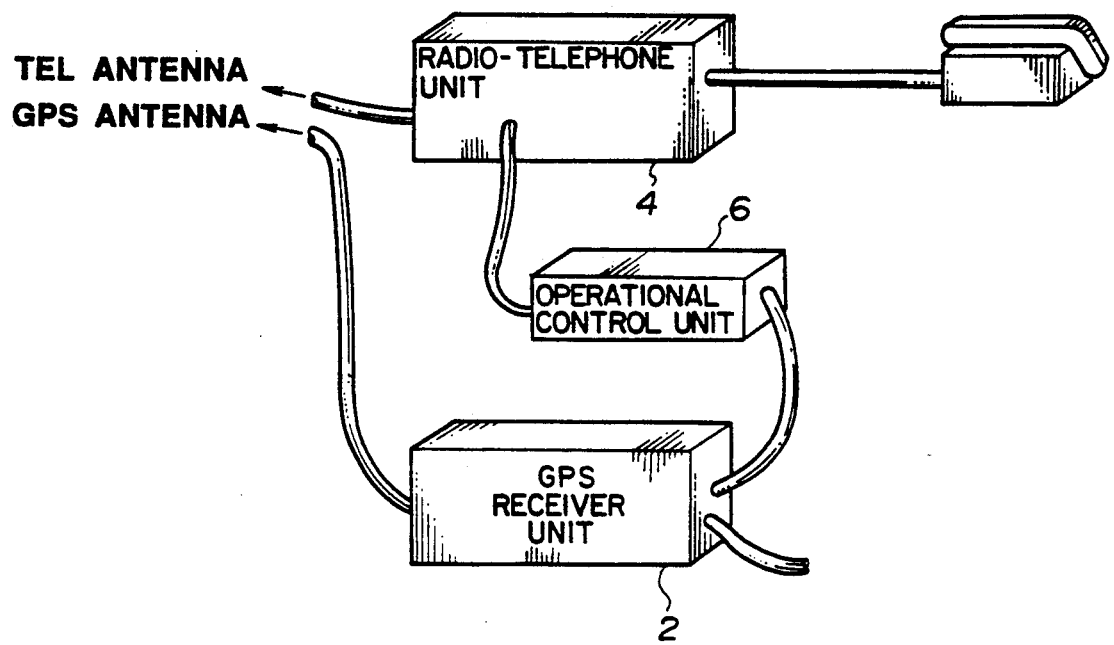
FIG. 1 is a schematic perspective view showing general structure of an overall system for controlling operations of a GPS receiver unit and a radio telephone unit according to first and second preferred embodiments of the present invention.

Referring now to the drawings, first and second preferred embodiments of a system for controlling operations of a GPS receiver unit and a radio telephone unit for an automotive vehicle according to the present invention will be described with reference to FIGS. 1 to 4.

FIG. 1 schematically shows the general structure of the system according to the first and second preferred embodiments. The system includes a GPS receiver unit 2, a radio telephone unit 4 and an operation control unit 6 electrically connecting the GPS receiver unit 2 and the telephone unit 4 for controlling the operations thereof.

FIG. 2 shows the first preferred embodiment of the system. In FIG. 2, the GPS receiver unit 2 includes a GPS signal receiver circuit 8 which receives the GPS signal from satellites (not shown) through a GPS antenna 10 for demodulating same to derive positional data encoded in the GPS signal. The GPS signal receiver circuit 8 includes mixers 12, 20, 30 and 34, an oscillator 14, an amplifier 16, a phase difference detector 18, a band-pass filter 22, multipliers 29 and 31 and a voltage controlled oscillator (VCO) 32 etc. Since the GPS signal receiver circuit 8 itself including these elements are well known in the art, no further explanation about the operation thereof will be made hereinafter.

In this embodiment, the GPS signal receiver circuit 8 further includes a GPS signal detector 24 connected to an output side of the band-pass filter 22, a GPS signal level detector 26 connected to the GPS signal detector 24, and an ON/OFF switch 28 connected between the GPS signal level detector 26 and the mixers 30 and 34. An ON state of the switch 28 as shown in FIG. 2 enables the GPS signal receiver circuit 8 to receiver the GPS signal through the GPS antenna 10 for processing same, while, an OFF state of the switch 28 disables the GPS signal receiver circuit 8 to receive the GPS signal through the GPS antenna 10 for processing same.

The telephone unit 4 includes a receiver circuit 36 and a transmitter circuit 38. The receiver circuit 36 includes a radio frequency amplifier 40, a band-pass filter 42 and a mixer 44 etc. as in the known way for receiving a telephonic radio signal through a telephone antenna 46 to demodulate same so as to derive voice data and others encoded in the received telephonic radio signal. The transmitter circuit 38 includes a phase-locked loop (PLL) 48 including a VCO 50 having an output frequency band of 825.03 MHz to 844.98 MHz and a prescaler 52. The PLL 48 works as a frequency synthesizer which performs frequency conversion of a modulated signal encoded with voice data from a microphone and fed through a modulation section (not shown), so as to provide a call channel signal. The call channel signal is then fed to the telephone antenna 46 through a driver amplifier 56, a band-pass filter 58, an automatic gain control circuit (AGC) 60 including a power amplifier 62 and an isolator 64 to be transmitted through a given call radio channel.

The telephone unit 4 has an ON-CALL MODE in which the call channel signal is transmitted through the telephone antenna 46 or a call channel signal from another telephone unit is received through the antenna 46, and an OFF-CALL MODE in which no call channel signal is transmitted and received through the antenna 46.

The frequency synthesizer 48 further provides a control channel signal which is fed to the antenna 46 in the same manner as the call channel signal, to be transmitted through a control radio channel. The control channel signal is transmitted through the antenna 46 during the telephone unit 4 being in OFF-CALL MODE. The control channel signal includes a scanning signal which is transmitted through the antenna 46 at predetermined timings during the telephone unit 4 being in OFF-CALL MODE for scanning control radio channels to detect an available control radio channel.

The telephone unit 4 further includes a microcomputer 66 electrically connected between the receiver and transmitter circuits 36 and 38 for monitoring operating states thereof, i.e. whether the telephone unit 4 is operating under ON-CALL MODE or OFF-CALL MODE.

Since the telephone unit 4 itself including the above-noted elements are well known in the art, and the call channel signal and the control channel signal are also well known in the art, no further explanation thereof will be made hereinbelow.

The operation control unit 6 is electrically connected between the GPS signal receiver circuit 8 and the telephone transmitter circuit 38. The operation control unit 6 includes a microcomputer 68, a switch 70, a comparator 72 and an inverter 74. The microcomputer 68 is connected to the microcomputer 66 for mutual communication therebetween, to the GPS signal level detector 26 for receiving a GPS signal level indicative signal therefrom, and to the ON/OFF switch 28 for controlling the ON/OFF operations of the switch 28. The microcomputer 68 is further connected to the switch 70 for controlling the changeover operations thereof. The switch 70 is further connected to the GPS signal detector 24 and to the comparator 72. The comparator 72 is further connected to the inverter 74 which is in turn connected to the AGC 60 through a line 76.

Now, the operation of the first preferred embodiment will be described hereinbelow with reference to FIG. 2.

When the microcomputer 68 discriminates that the GPS signal level detected by the level detector 26 becomes less than a preselected level, such as, $-130$ dBm, the microcomputer 68 communicates with the microcomputer 66 to determine whether the telephone unit 4 is in ON-CALL MODE or OFF-CALL MODE.

In cases the telephone unit 4 is operated in OFF-CALL MODE, the microcomputer 68 controls the ON/OFF switch 28 to be set ON as shown in FIG. 2 for enabling the GPS signal receiver circuit 8 to receive and process the GPS signal. Simultaneously, the microcomputer 68 controls the switch 70 to be set to a first position as shown in FIG. 2. Accordingly, the detected GPS signal is fed from the GPS signal detector 24 to the AGC 60 through the comparator 72 and the inverter 74. The power amplifier 62 of the AGC 60 is designed to power off in response to a low level signal and power on in response to a high level signal. Accordingly, when the GPS signal shaped by the comparator 72 as illustrated in FIG. 2 is fed to the AGC 60 through the inverter 74, the AGC 60 powers off so that no control channel signal, such as, no scanning signal is fed to the telephone antenna 46. Therefore, when the GPS signal receiver circuit 8 is being operated to receive and process the GPS signal, no jammer signal is transmitted through the telephone antenna 46. On the other hand, when no GPS signal is received in the GPS signal receiver circuit 8, the AGC is powered on to feed the control channel signal to the telephone antenna 46 to be transmitted therefrom. Since no GPS signal is being received in the GPS signal receiver circuit 8, no substantial jamming occurs.

It is to be appreciated that in cases the number of occurrences of the GPS signal input into the AGC 60 is so large to reduce the number of occurrences of the control channel signal transmitted through the antenna 46 to less than a predetermined number, the microcomputer 66 commands the microcomputer 68 to set the switch 70 to a second position from the first position so as to connect the AGC 60 to a power supply (−Vcc). Accordingly, a high level signal is fed to the AGC 60 to power it on. This forcible changeover of the switch 70 continues, for example, for a set time.

On the other hand, in cases the telephone unit 4 is operated in ON-CALL MODE, the microcomputer 68 controls the ON/OFF switch 28 to be set OFF for disabling the GPS signal receiver circuit 8 to receive the GPS signal through the GPS antenna 10. Simultaneously, the microcomputer 68 controls the switch 70 to be set to the second position so as to power on the AGC 60. Accordingly, the call channel signal is fed to the telephone antenna 46 through the AGC 60 to be transmitted therefrom.

As appreciated from the foregoing description about the first preferred embodiment, the GPS signal receiver circuit 8 and the telephone transmitter circuit 38 are alternatively operated both in ON-CALL MODE and OFF-CALL MODE during the monitored GPS signal level being less than the preselected value. If required, however, the alternative operations of the GPS signal receiver circuit 8 and the telephone transmitter circuit 38 may be performed regardless of the detected GPS signal level by setting the microcomputer 68 to constantly communicate with the microcomputer 66 for determining whether the telephone unit 4 is in ON-CALL MODE or OFF-CALL MODE.

Figure 4:
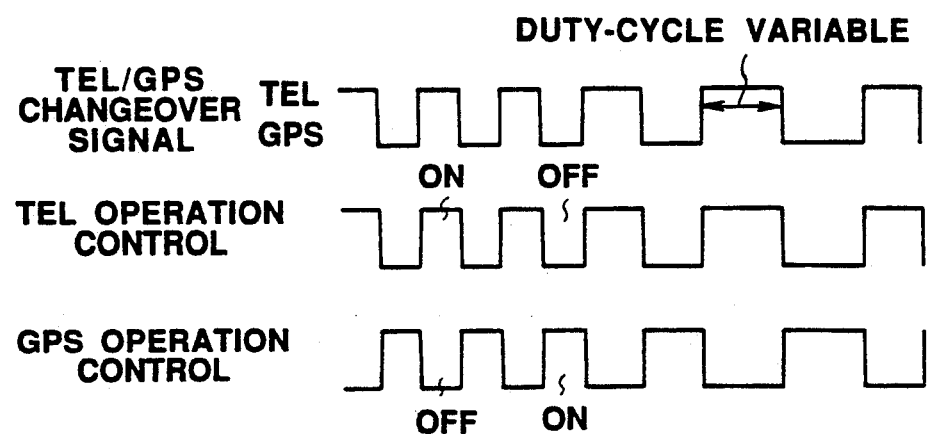
FIG. 4 is a timing chart for showing alternative operations of a GPS receiver unit and a radio telephone unit according to the second preferred embodiment.
Figure 3:
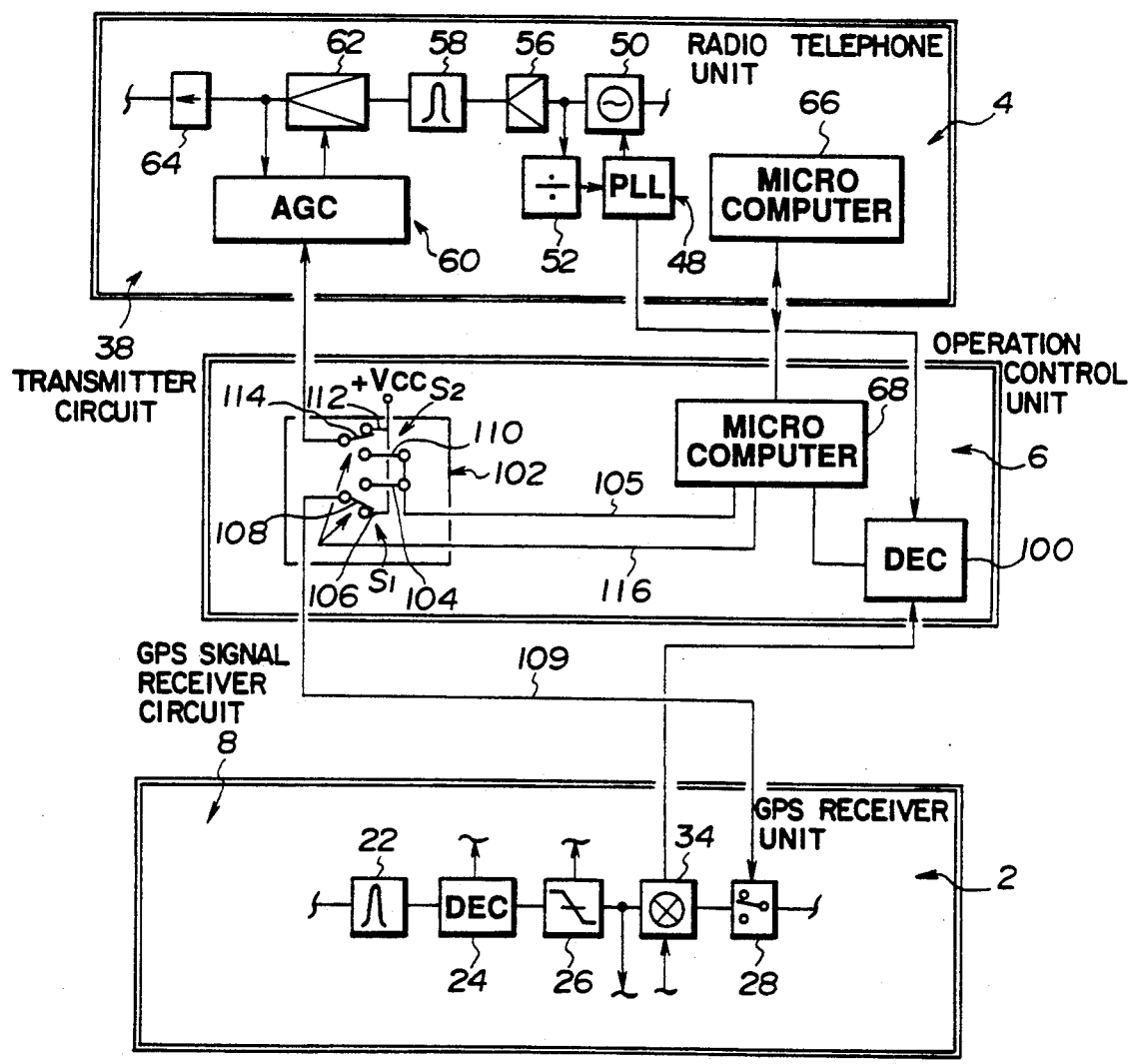
FIG. 3 is a circuitry block diagram showing the second preferred embodiment of the present invention.

Now, the second preferred embodiment will be described hereinbelow with reference to FIGS. 3 and 4, wherein the same or like elements are designated by the same reference numerals as in FIG. 2 so as to omit the explanation thereof for avoiding redundant disclosure.

In the second preferred embodiment, the operation control unit 6 includes a phase difference detector 100 which is connected to the PLL 48 and to the mixer 34 which is disposed between the GPS signal level detector 26 and the ON/OFF switch 28. The phase difference detector 100 compares outputs from the PLL 48 and the mixer 34 to produce a TEL/GPS changeover pulse signal as shown in FIG. 4. Specifically, the phase difference detector 100 outputs a high level signal when the PLL signal is high and the mixer signal is low, and vice versa, and outputs a low level signal otherwise. Accordingly, a duty-cycle of the TEL/GPS changeover signal is variable depending on frequency variation of the PLL signal and the mixer signal. The TEL/GPS changeover signal is fed to the microcomputer 68. The microcomputer 68 is connected to a switching unit 102 which includes switches $S_1$ and $S_2$. Specifically, the switch $S_1$ includes a fixed contact 104 to which the microcomputer 68 is connected through a line 105, a fixed contact 106 connected to a power supply (+Vcc), and a movable contact 108 which is connected to the ON/OFF switch 28. The ON/OFF switch 28 is designed to be set ON to enable the GPS signal receiver circuit 8 to receive and process the GPS signal when receiving a low level signal through a line 109 and to be set OFF when receiving a high level signal through the line 109. The switch $S_2$ includes a fixed contact 110 to which the microcomputer 68 is connected through the line 105, a fixed contact 112 connected to the power supply (+Vcc), and a movable contact 114 which is connected to the AGC 60. The changeover operations of the movable contacts 108 and 114 are controlled by a control signal fed from the microcomputer 68 through a line 116. Specifically, when the control signal is in a low level, the movable contacts 108 and 114 are set to contact the fixed contacts 106 and 112, respectively, as shown in FIG. 3. On the other hand, when the control signal is in a high level, the movable contacts 108 and 114 are set to contact the fixed contacts 104 and 110, respectively.

The other structures are the same as in the first preferred embodiment of FIG. 2.

Now, the operations of the second preferred embodiment will be described with reference to FIG. 3.

When the microcomputer 68 discriminates based on communication with the microcomputer 66 that the telephone unit 4 is operated in ON-CALL MODE, the microcomputer 68 outputs a low level of the control signal through the line 116. Accordingly, the movable contacts 108 and 114 are set to contact the fixed contacts 106 and 112, respectively, as shown in FIG. 3. As a result, a high level signal is fed to the AGC 60 from the power supply (+Vcc) to power it on for enabling the call channel signal to be transmitted through the telephone antenna 46. Simultaneously, a high level signal is also applied to the ON/OFF switch 28 through the line 109 to set it OFF.

On the other hand, when the microcomputer 68 determines that the telephone unit 4 is operated in OFF-CALL MODE, the microcomputer 68 outputs a high level of the control signal through the line 116. Accordingly, the movable contacts 108 and 114 are set to contact the fixed contacts 104 and 110, respectively. Simultaneously, the microcomputer 68 supplies the TEL/GPS changeover signal as shown in FIG. 4 through the line 105. As a result, high and low levels of the TEL/GPS changeover signal are alternately fed to the AGC 60 as well as to the ON/OFF switch 28. Since the same signal is fed to the AGC 60 and the ON/OFF switch 28, and since the AGC 60 powers on in response to a high level signal and the ON/OFF switch 28 is set OFF in response to a high level signal, and vice versa, the GPS signal receiver circuit 8 and the telephone transmitter circuit 38 are controlled to be set operative alternatively, which is clearly shown in FIG. 4.

It is to be appreciated that the TEL/GPS changeover signal may be produced solely based on the PLL signal. In this case, the phase difference detector 100 may be omitted and the PLL signal may be fed to the microcomputer 68. Further, the GPS signal detector 24 and the GPS signal level detector 26 may be omitted in the second preferred embodiment since the alternative operations of the GPS signal receiver circuit 8 and the telephone transmitter circuit 38 are performed regardless of the GPS signal level according to the second preferred embodiment.

As appreciated from the foregoing description about the second preferred embodiment, the GPS signal receiver circuit 8 and the telephone transmitter circuit 38 are alternatively operated both in ON-CALL MODE and OFF-CALL MODE regardless of the GPS signal level.

It is to be understood that this invention is not to be limited to the embodiments described above, and that various changes and modifications may be made without departing from the spirit and scope of the invention as defined in the appended claims.

What is claimed is:

1. A system for controlling operations of a GPS receiver unit and a radio telephone unit, said GPS receiver unit including a GPS antenna for receiving a GPS signal and a GPS signal receiver circuit connected to the GPS antenna for processing the received GPS signal, said radio telephone unit including a telephone antenna and a telephone transmitter circuit connected to the telephone antenna for transmitting a call channel signal during a time when the radio telephone unit is in an ON-CALL MODE and a control channel signal during a time when the radio telephone unit is in an OFF-CALL MODE, said system comprising:

monitor means for determining whether said radio telephone unit is in said ON-CALL MODE or said OFF-CALL MODE only when a signal level of the received GPS signal is less than a preselected value; and operation control means for setting said telephone transmitter circuit operative to transmit said call channel signal through said telephone antenna and for setting said GPS signal receiver circuit inoperative during a time when said radio telephone unit is in the ON-CALL MODE, wherein said operation control means selectively sets said telephone transmitter circuit operative to transmit said control channel signal through said telephone antenna during a time when said radio telephone unit is in the OFF-CALL MODE.

2. The system as set forth in claim 1, wherein said operation control means alternately operates said telephone transmitter circuit and said GPS signal receiver circuit at a time when said radio telephone unit is in the OFF-CALL MODE.

3. The system as set forth in claim 1, wherein said operation control means includes first switching means being operable between a first position which allows the received GPS signal to be fed to the telephone transmitter circuit therethrough and a second position which sets the telephone transmitter circuit operative, and wherein said first switching means is retained in said first position when said radio telephone unit is in the OFF-CALL MODE to set said telephone transmitter circuit inoperative when said GPS signal is fed to said telephone transmitter circuit through said first switching means and operative when no GPS signal is fed thereto through said first switching means, and wherein said first switching means is retained in said second position when said radio telephone unit is in the ON-CALL MODE to set said telephone transmitter circuit operative.

4. The system as set forth in claim 3, wherein said operation control means includes second switching means being operable between a third position which sets said GPS signal receiver circuit operative and a fourth position which sets said GPS signal receiver circuit inoperative, and wherein said second switching means is retained in said fourth position when said radio telephone unit is in the ON-CALL MODE and in said third position when said radio telephone unit is in the OFF-CALL MODE.

5. The system as set forth in claim 3, wherein said first switching means is set to said second position in the OFF-CALL MODE when the number of occurrences of the control channel signal transmitted through said telephone antenna becomes less than a predetermined value.

6. The system as set forth in claim 1, wherein said operation control means includes first switching means being operable between a first position where said telephone transmitter circuit is set operative and said GPS signal receiver circuit is set inoperative, and a second position where said telephone transmitter circuit and said GPS signal receiver circuit are alternately set operative, and wherein said first switching means is retained in said first position when said radio telephone unit is in the ON-CALL MODE and in said second position when said radio telephone unit is in the OFF-CALL MODE.

7. The system as set forth in claim 6, wherein a TEL/GPS changeover pulse signal having first and second signal levels is fed to the telephone transmitter circuit and to the GPS signal receiver circuit when said first switching means is in said second position, and wherein said telephone transmitter circuit is set operative in response to said first level and inoperative in response to said second level, while, said GPS signal receiver circuit is set operative in response to said second level and inoperative in response to said first level.

8. The system as set forth in claim 7, wherein said TEL/GPS changeover pulse signal is an output signal of a frequency synthesizer produced when the radio telephone unit is in the OFF-CALL MODE, said frequency synthesizer incorporated in said radio telephone unit.

9. The system as set forth in claim 7, wherein said TEL/GPS changeover pulse signal is formed based on the received GPS signal and an output signal of a frequency synthesizer produced when the radio telephone unit is in the OFF-CALL MODE by comparing levels of both signals, said frequency synthesizer incorporated in said radio telephone unit.

10. The system as set forth in claim 7, wherein said operation control means includes second switching means which forms a portion of the GPS signal receiver circuit, said second switching means being operable between a third position which sets the GPS signal receiver circuit operative and a fourth position which sets the GPS signal receiver circuit inoperative, and wherein said second switching means is set to said third position in response to said second level and set to said fourth position in response to said first level.

11. The system as set forth in claim 10, wherein a constant level signal having said first level is fed to the telephone transmitter circuit and to the GPS signal receiver circuit when said first switching means is in said first position to set the telephone transmitter circuit operative and to set said second switching means to said fourth position so as to set the GPS signal receiver circuit inoperative.

12. The system as set forth in claim 1, wherein said operation control means selectively sets said telephone transmitter circuit operative when said radio telephone unit is in the OFF-CALL MODE in such a manner as to prevent said control channel signal from affecting the GPS signal to be processed by said GPS signal receiver circuit.

13. The system as set forth in claim 1, wherein said operation control means, when said radio telephone unit is in the OFF-CALL MODE, sets said telephone transmitter circuit and said GPS signal receiver circuit operative in such a manner as to prevent said telephone transmitter circuit and said GPS signal receiver circuit from being operated simultaneously.

14. The system as set forth in claim 1, wherein said operation control means intermittently sets said telephone transmitter circuit operative when said radio telephone unit is in the OFF-CALL MODE.

15. A system for controlling operations of a GPS receiver unit and a radio telephone unit, said GPS receiver unit including a GPS antenna for receiving a GPS signal and a GPS signal receiver circuit connected to the GPS antenna for processing the received GPS signal, said radio telephone unit including a telephone antenna and a telephone transmitter circuit connected to the telephone antenna for transmitting a call channel signal during a time when the radio telephone unit is in an ON-CALL MODE and a control channel signal during a time when the radio telephone unit is in an OFF-CALL MODE, said system comprising:

monitor means for determining whether said radio telephone unit is in said ON-CALL MODE or said OFF-CALL MODE; and operation control means including first switching means operable between a first position which allows the received GPS signal to be fed to the telephone transmitter circuit therethrough and a second position which sets the telephone transmitter circuit operative, wherein said first switching means is retained in said first position when said radio telephone unit is in the OFF-CALL MODE to set said telephone transmitter circuit inoperative when said GPS signal is fed to said telephone transmitter circuit through said first switching means and operative when no GPS signal is fed thereto through said first switching means, and wherein said first switching means is retained in said second position when said radio telephone unit is in the ON-CALL MODE to set said telephone transmitter circuit operative and is set to said second position in the OFF-CALL MODE when the number of occurrences of the control channel signal transmitted through said telephone antenna becomes less than a predetermined value.

* * * * *